(No Model.)

A. N. CROSS.
ATTACHMENT FOR WHEELS.

No. 590,734. Patented Sept. 28, 1897.

Witnesses

Inventor
Albert N. Cross

UNITED STATES PATENT OFFICE.

ALBERT N. CROSS, OF BABCOCK, WISCONSIN.

ATTACHMENT FOR WHEELS.

SPECIFICATION forming part of Letters Patent No. 590,734, dated September 28, 1897.

Application filed November 11, 1896. Serial No. 611,779. (No model.)

*To all whom it may concern:*

Be it known that I, ALBERT N. CROSS, a citizen of the United States, residing at Babcock, in the county of Wood and State of Wisconsin, have invented a new and useful Attachment for Wheels, of which the following is a specification.

The invention relates to improvements in attachments for wheels.

The object of the present invention is to provide a simple and inexpensive device adapted to be applied to the wheels of road-grading machines to prevent such machines from slipping laterally, especially when operating on an inclined surface, and capable of being readily removed from the wheels when such machines are not in use or when it is not necessary to employ them.

A further object of the invention is to provide simple and inexpensive means for scraping mud from the attachment and preventing the wheels of the machine from becoming clogged.

The invention consists in the construction and novel combination of parts hereinafter fully described, illustrated in the accompanying drawings, and pointed out in the claims hereto appended.

Figure 1:
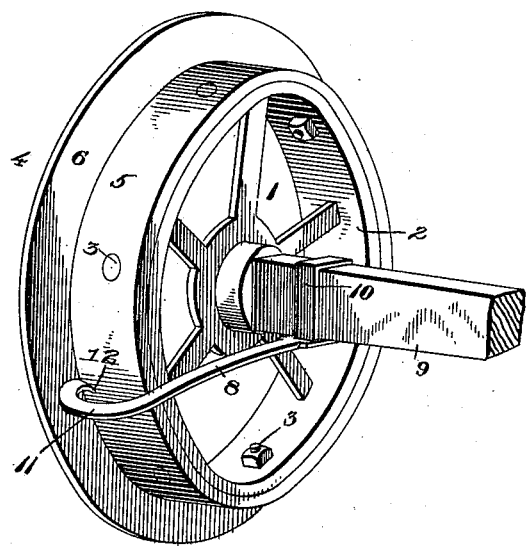
Figure 2:
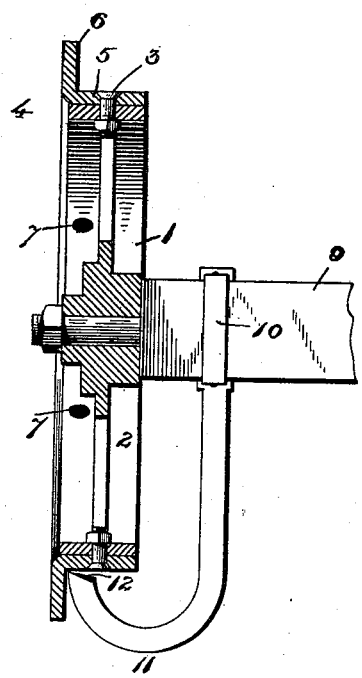

In the drawings, Figure 1 is a perspective view of a wheel provided with an attachment constructed in accordance with this invention. Fig. 2 is a horizontal sectional view of the same.

Similar numerals of reference designate corresponding parts in both figures of the drawings.

Referring to the drawings, 1 designates a wheel having a flat rim 2 and designed to be mounted on an axle of the road-grading machine in the usual manner, and as the road-grading machine does not form a part of the present invention and as the device is applicable to similar machines it is unnecessary to describe a complete machine of this kind. The rim 2 is provided at intervals with perforations for the reception of bolts 3 or other suitable fastening devices for securing an attachment 4 to the rim of the wheel; and the attachment 4 consists of a ring or band 5, arranged snugly on the rim of the wheel 1 and provided with perforations registering with those of the rim, and an annular flange 6, preferably arranged in substantially the same plane as the outer face of the wheel and adapted to sink into the ground and obtain a firm hold, whereby a road-grading or similar machine is prevented from slipping laterally, especially when operating on inclined surfaces.

The attachment can be readily removed from the wheel when the road-grading machine is not in operation and when it is desired to transfer the same from one place to another, and it may be quickly replaced on the wheel when desired.

The rim of the wheel is provided with additional perforations 7, located outside of the inner series of perforations, and by arranging the bolt in the outer perforations 7 the tread of the wheel will be increased to prevent the wheel from sinking too deep in soft earth.

In order to prevent mud and soft earth from clinging to the attachment, a scraper 8 is employed. The scraper 8, which is secured to the axle 9 by a clip 10, extends rearward therefrom, being disposed substantially horizontal, and its outer portion 11 is curved transversely and terminates opposite the outer face of the ring or band 5. The extreme end 12 of the scraper curves downward slightly in order to present an edge to mud or earth clinging to the attachment.

It will be seen that the attachment is simple and comparatively inexpensive in construction, that it is adapted to be applied to the wheels of a road-grading or similar machine, and that it is capable of preventing such a machine from slipping on inclined surfaces.

It will also be apparent that the attachment may be readily removed when the machine is not in operation and that effectual means are provided for preventing it from becoming clogged with mud or soft earth.

What I claim is—

1. In a device of the class described, the combination with a wheel having a flat rim provided with inner and outer series of perforations, of an attachment consisting of a ring or band arranged on the rim of the wheel and provided with a series of perforations adapted to register with either of the series of perforations of the rim of the wheel, and a vertically-disposed annular flange extending from the outer edge of the ring or band, and fastening devices passing through perforations of the ring or band and rim, and securing the attachment to the wheel, said fastening devices being adapted to be arranged in the inner or the outer series of perforations to vary the tread of the wheel, substantially as described.

2. In a device of the class described, the combination of an axle and wheel journaled thereon, an attachment secured to the wheel and provided with a flange, and a scraper clipped to the axle extending rearward therefrom and having a curved outer portion disposed transversely of the periphery of the wheel, the outer terminal of the scraper being bent downward, substantially as described.

In testimony that I claim the foregoing as my own I have hereto affixed my signature in the presence of two witnesses.

ALBERT N. CROSS.

Witnesses:
MARY S. REMINGTON,
KITTY REMINGTON.